(12) United States Patent
Chan et al.

(10) Patent No.: US 6,516,129 B2
(45) Date of Patent: Feb. 4, 2003

(54) PROCESSING PROTECTIVE PLUG INSERT FOR OPTICAL MODULES

(75) Inventors: Benson Chan, Vestal, NY (US); Paul F. Fortier, Richelieu (CA); Francois Guindon, San Diego, CA (US); Gerald Daniel Malagrino, Jr., Rochester, MN (US); James Robert Moon, Oronoco, MN (US); James Earl Olson, Rochester, MN (US); John Henry Sherman, Lisle, NY (US)

(73) Assignee: JDS Uniphase Corporation, San Jose, CA (US)

( * ) Notice: Subject to any disclaimer, the term of this patent is extended or adjusted under 35 U.S.C. 154(b) by 23 days.

(21) Appl. No.: 09/893,812

(22) Filed: Jun. 28, 2001

(65) Prior Publication Data

US 2003/0002837 A1 Jan. 2, 2003

(51) Int. Cl.$^7$ .............................. G02B 6/00; G02B 6/10
(52) U.S. Cl. ........................ 385/134; 385/147; 339/38
(58) Field of Search .................... 385/134, 147, 385/93, 89, 1; 137/327, 329.3; 60/63.6, 63.5, 62; 339/94, 96, 117 R, 38; 294/104; 285/110, 345

(56) References Cited

U.S. PATENT DOCUMENTS

| | | | | |
|---|---|---|---|---|
| 3,387,252 A | | 6/1968 | Rothweiler ................... 339/38 |
| 4,109,989 A | * | 8/1978 | Snyder et al. ............... 439/140 |
| 4,276,899 A | * | 7/1981 | Kirk-Duncan .............. 137/327 |
| 4,366,669 A | * | 1/1983 | Jones .................... 220/203.02 |
| 4,640,575 A | | 2/1987 | Dumas ....................... 350/96.2 |
| 4,767,179 A | | 8/1988 | Sampson et al. .......... 350/96.2 |
| 4,779,950 A | | 10/1988 | Williams .................. 350/96.21 |
| 4,795,354 A | | 1/1989 | Owen .......................... 439/137 |
| 4,979,792 A | | 12/1990 | Weber, et al. ............... 350/96.2 |
| 5,202,949 A | | 4/1993 | Hileman et al. ............. 385/134 |
| 5,243,678 A | | 9/1993 | Schaffer et al. ............. 385/134 |
| 5,333,225 A | | 7/1994 | Jacobowitz et al. ........... 385/93 |
| 5,499,311 A | | 3/1996 | DeCusatis ..................... 385/89 |
| 5,547,230 A | * | 8/1996 | Bank et al. .................. 285/110 |
| 5,967,189 A | | 10/1999 | Cheng .......................... 138/89 |
| 6,088,502 A | | 7/2000 | Faist et al. .................. 385/134 |
| 6,258,069 B1 | * | 7/2001 | Carpentier et al. ......... 604/208 |

FOREIGN PATENT DOCUMENTS

| | | | | |
|---|---|---|---|---|
| JP | 6333634 | 12/1994 | ........... H01R/13/52 |
| JP | 7235881 | 9/1995 | ........... H04B/1/034 |
| JP | 8262271 | 10/1996 | ............ G02B/6/36 |
| JP | 9178995 | 7/1997 | ............ G02B/6/44 |
| JP | 9297244 | 11/1997 | ............ G02B/6/36 |
| JP | 10048465 | 2/1998 | ............ G02B/6/36 |
| JP | 11231146 | 8/1999 | ............ G02B/6/00 |
| JP | 00147328 | 5/2000 | ............ G02B/6/42 |

* cited by examiner

*Primary Examiner*—Akm E. Ullah
(74) *Attorney, Agent, or Firm*—Allen, Dyer, Doppelt, Milbrath & Gilchrist, P.A.

(57) ABSTRACT

A plug which has a plugging portion and a stem extending therefrom is formed of an elastomeric material in order to deform to create a wiping engagement and a seal with the walls of a receiving cavity. The stem and plugging portion include both cavities for receiving alignment pins in the device being plugged and a manually engageable portion on a distal end of the stem for removing the plug from the sealed cavity, such as within an optical subassembly module. The side edges of the plugging member conform to the cavity cross-section to enhance the sealing yet do not unduly deform the member. The sealing member is formed with one or more standoffs to engage an end face of the cavity, assuring no contact between the optical elements and the plug. The edges of the plug deform upon insertion to create the seal and form a wiping engagement with the cavity interior.

19 Claims, 1 Drawing Sheet

PROCESSING PROTECTIVE PLUG INSERT FOR OPTICAL MODULES

CROSS REFERENCE TO RELATED CO-PENDING UNITED STATES PATENT APPLICATIONS

The subject matter of this application is related to the disclosures contained within: U.S. patent application Ser. No. 09/894,714, entitled ENHANCED OPTICAL COUPLER; and U.S. patent application Ser. No. 09/894,934, entitled ENHANCED OPTICAL TRANSCEIVER ARRANGEMENT; all assigned to International Business Machines Corporation and filed concurrently herewith.

FIELD OF THE INVENTION

This invention relates to protecting optical surfaces within an optical modules and more specifically, to plugging access channels extending into an electro-optical module or device during manufacturing process steps, thereby preventing contamination of or damage to optical surfaces and optical elements during the manufacturing processes.

BACKGROUND OF THE INVENTION

During an assembly manufacturing process of opto-electronic units or optical devices such as optical fibers, transmit optical sub-assemblies (TOSA's) and/or receive optical sub-assemblies (ROSA's), various operations, such as soldering, are required. These operations may include but are not limited to a sequence of one or more solder flux applications, solder paste depositions, solder reflow and washing to remove any previously deposited flux, or any remaining residue of the flux and solder paste.

The soldering steps are generally accomplished by reflow whereby solder paste or another form of solder is deposited at the site where soldering is to occur; next, the entire assembled unit or at least a portion thereof is heated to a temperature at which the solder is rendered molten and caused to reflow between various juxtaposed electrical contacts which are positioned in contact with the solder or solder paste. This solder reflow operation is conventional and well-known to those of ordinary skill in the art. Thus, the solder paste and the flux coact to permit all the solder pads or contacts in the assembly or subassembly not only to be soldered simultaneously but also with a high degree of quality control.

After solder reflow, upon cooling, a portion of the flux previously deposited in significant quantities may remain and must be removed and cleaned. Typically, this flux removal is accomplished by washing with a water bath. Flux composition is selected to be water soluble to enhance the removal of unconsumed flux from regions near soldered electrical joints.

The optical elements contained within the TOSA (transmit optical subassembly) and ROSA (receive optical subassembly), optical fibers and any exposed optical surfaces may be formed of light transmissive materials which are selected not only to optically function as desired but also to withstand the high temperatures encountered in solder reflow.

Optical fibers are normally glass, while other optical elements may be fabricated of clear high temperature plastics. However, heat may slightly affect the unprotected surfaces of the optical elements. Although not directly heat related, some damage to or degradation of the optical elements such as fiber optic ends, may be caused by contact between optical elements and molten solder, flux, flux residue or vapors resulting from the solder reflow operation.

Additionally, the optical surfaces of the devices or lens surfaces similarly may be contaminated, coated with water, or small quantities of water borne flux which may be deposited on the optical surfaces of the optical fibers. This contamination of the surfaces, a result of the wash operation, may alter or degrade the transmission of optical signals through such optical surfaces.

Other sources of contaminants such as dust or other foreign particles also may accumulate on the optical surfaces and adversely affect the transmission of signals through the optical fibers or other optical surfaces of the optical components during other manufacturing steps or subsequent handling, packaging, shipping or further assembly into larger units or subassemblies. With the optical elements recessed within an optical assembly, the cleaning and/or removal of the contaminants on optical elements and especially the exposed optical surfaces thereof is difficult if not impractical.

OBJECTS OF THE INVENTION

It is an object of the invention to protect the optical elements of an optical subassembly at least during the manufacture and assembly of the optical subassembly.

It is another object of the invention to seal the access channel to optical surfaces within an optical subassembly during the manufacturing steps of assembly of the optical subassemblies.

It is a further object of the invention to prevent invasion of water or other contaminants into the region of the optical elements of an optical subassembly during wash operations of the assembly process.

It is an additional object of the invention to withstand temperatures of solder reflow operations during the manufacture of optical subassemblies.

It is still another object of the invention to prevent heat related deformation of the optical subassembly connector by the presence of the invention during solder reflow operations.

It is a still further object of the invention to maintain a continuous seal with the optical subassembly connector housing during all periods for which the invention is resident within the optical subassembly connector housing.

It is a still additional object of the invention to be readily removable from the housing of the optical subassembly.

SUMMARY OF THE INVENTION

A channel within the optical subassembly, module housing or connector with optical elements therein. is plugged and sealed in order to seal access to and protect optical components, and particularly the optical surfaces of optical components of an optical subassembly during the manufacturing process steps of assembly of the optical subassembly, and especially the solder reflow and wash steps of such a process. The portions requiring isolation and protection are the exposed optical surfaces of the optical elements.

The channel plug, a fluoro-elastomeric material, is typically by manufactured molding. The fluoro-elastomer is chosen to be capable of withstanding temperatures up to about 260° C., the upper limit of a common solder reflow temperature range.

The plug is formed with a plugging and sealing end which is relatively thin but which is sufficiently thick to provide sufficient stability to form a wiping engagement with the walls of a channel within the optical subassembly. The plugging end is molded to form a periphery conforming in shape to the interior of an optical subassembly channel and dimensioned to be slightly larger than the interior of an optical subassembly channel. The peripheral shape of a plug end is substantially the same as but slightly larger than the interior dimensions of sidewalls of the channel to be plugged. Edges of a plugging portion engage the side walls and may be formed either as arcuate edges wherein interior side walls of the channel are similarly arcuate. The top and bottom wall engaging edges may be substantially straight or curved as required to conform to the edges of a cross-section of the channel.

Due to the slightly oversize relationship of the plug end portion to the interior of the channel, the plug deforms, compresses, and/or deflects due to its elastomeric nature, whenever inserted into the channel. The deflection of the edge margins of the plug creates not only a wiping contact and a forceful seal between the edge margins but also an inherent retention force which seals and retains the plug in place until removed by forcible withdrawal. The edge margins similarly will deform or deflect under the withdrawal force being exerted on the plugging end.

In an attempt to restore to its undeformed and undeflected state, the plugging portion exerts a small but sufficient force on the interior of the channel walls to effect a water-tight and debris-tight seal between the plugging portion and the channel walls.

A stem is joined to and extends from one surface of the plug member. The stem terminates in an enlarged flattened bulbous portion configured to be easily and reliably grasped by a thumb and finger in order to pull and remove the plug from the channel of an optical subassembly. The junction between a stem and the sealing plug portion is enlarged in cross-section so that only a narrow peripheral zone or margin of the sealing plug is unsupported by a stem, thereby concentrating deflection of the elastomeric plug member in the periphery or edge margins of the plug portion. This concentration of deflection increases the sealing forces relative to members without similar support.

The opposing face of the plug portion may be provided with protrusions or standoff members to insure that the surface of the plug portion is prevented from contacting the ends of the optical fibers or other optical surfaces within the connector. The standoffs are spaced from each other to provide a space adjacent the ends of the optical fibers or surfaces of the optical components whenever the plug is installed as intended.

This Summary of the Invention is provided to give one of skill in the art a synopsis of the main aspects of the invention and is not intended for limiting nor should it be used to limit the scope of the invention in any manner.

One of skill in the art may acquire a more complete understanding of the invention from the following Detailed Description of the Invention and the attached drawings.

DETAILED DESCRIPTION OF THE PREFERRED EMBODIMENT OF THE

BEST MODE FOR CARRYING OUT THE INVENTION AS CONTEMPLATED BY THE INVENTORS

Figure 1:
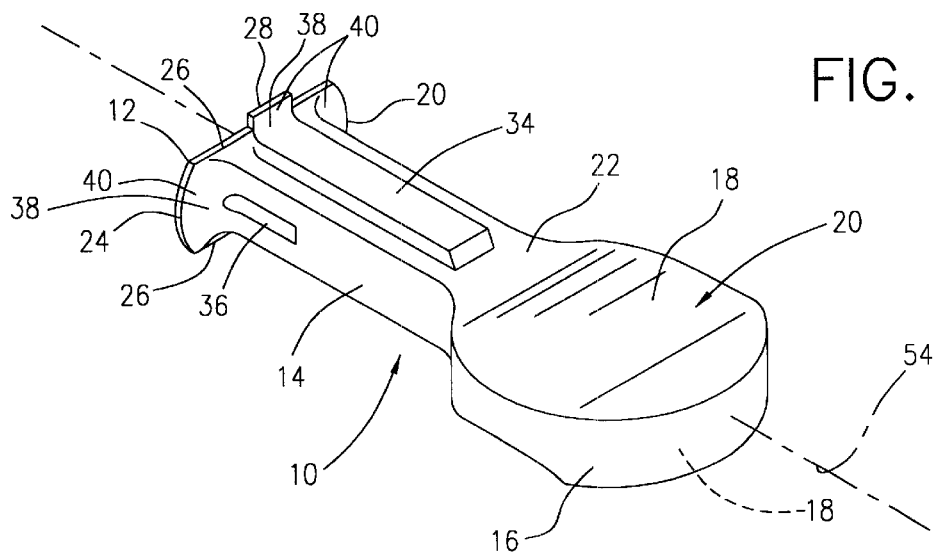
FIG. 1 is an isometric view of the bottom of the plug and stem.

In order to fully understand the invention, it is recommended that initial reference be made to FIG. 1 of the drawings.

The process protective plug 10 is illustrated in an isometric view. The plugging portion 12 of the protective plug 10 is disposed and formed on an end of a stem 14 and is substantially perpendicular to a longitudinal axis 54 of the stem 14.

The stem 14 is formed at its opposite end into a enlarged portion 16. The enlarged surfaces 18 form thumb/finger gripping regions on the outboard end 22 of the stem 14. Stem 14 is formed with a longitudinal dimension sufficient that the plugging portion 12 may seat in the bottom or end of a channel 60 leaving the grip 20 extending from the optical subassembly connector channel 60 as will be described in more detail below with reference to FIG. 3.

Figure 2:
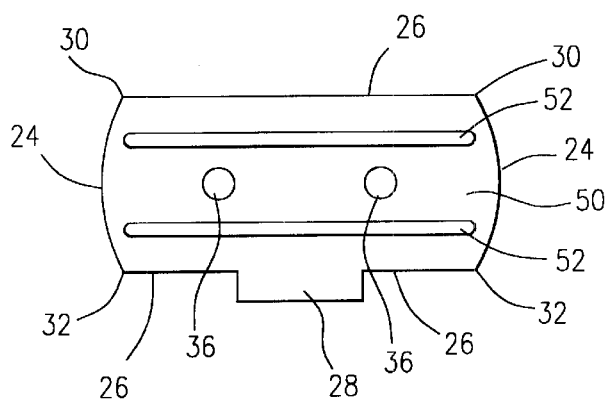
FIG. 2. is view of the face of the plugging portion of the protective plug with standoffs.
Figure 3:
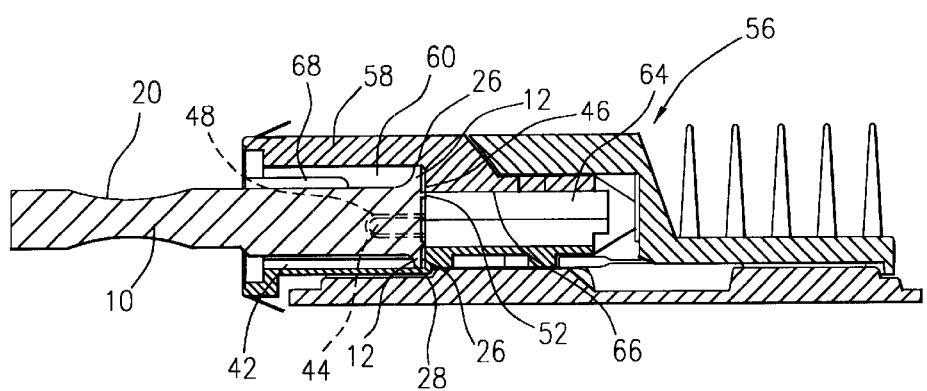
FIG. 3 is a partial sectional view of an optical subassembly connector with the plug of the invention installed therein.

Referring now to FIGS. 1 and 3, stem 14 of plug 10 may be provided with a key 34 and the receiving channel 60 may have a mating keyway 42 or other subchannel 42 to accommodate the key 34 insertable into keyway 42. Key 34 may be formed on one of the surfaces of stem 14 and extend there along. Key 34 creates additional stiffness in stem 14 and further supports a tab 28 extending from the plugging portion 12 in an essentially co-planar relationship with the plugging portion 12. The support supplied to the tab 28 prevents excessive deformation of the tab 28 and insures that the tab 28 will adequately engage the walls of the keyway 42 or subchannel 42 and particularly the walls of the keyway 42 within which it is resident. By maintaining the engagement of the tab 28 with the walls of keyway 42 as shown in FIG. 2, the seal formed by the plugging portion 12 and particularly tab 28 with the walls of keyway 42 or walls of subchannel 42 is assured.

Passages 36 are formed on and into opposing sides of the stem 14 of plug 10 and extend through plugging portion 12. These passage 36 receive alignment pins 44 disposed within and extending into the channel 60 of the optical subassembly 56 as shown in FIG. 3. Passages 36 are sized to surround the alignment pins 44 and leave only a very small gap 48 intermediate the passages 36 and alignment pins 44. The gap 48 is small enough that the surface tension of the wash water will prevent any water from passing through the gaps 48.

Referring again to FIG. 1, at the point of attachment or joining with the plugging portion 12, stem 14 progressively widens to form a filet 38. This widening of the stem 14 distributes the extraction forces exerted on stem 14 pulling on the plugging portion 12 and thereby reduces the prospect of failure of the elastomeric material in that region during removal of plug 10.

An additional benefit of the filets 38 is that support of the plugging portion 12 is extended from the nominal footprint of the stem 14 on the plugging portion 12 toward the edges 24, 26 of the plugging portion 12, thereby reducing the width of the edge margins 40. By reducing the width of the edge margins 40, the rigidity of the plugging portion 12 near its edges, particularly the arcuate edges 24 located most distant from the stem 14, is increased while retaining a controlled deformability that is necessary for a wiping edge engagement and seal with the channel 60.

Reference to FIGS. 2 and 3 is now appropriate. On the exposed face 50 of plugging portion 12, best seen in FIG. 2, are disposed a pair of standoffs 52. The standoffs 52 are protruding members or projections extending from the plugging portion 12 of the plug 10. Upon insertion of the plug 10 and seating of the plugging portion 12 into a receiving channel 60, the standoffs 52 engage the end face 46 of channel 60.

The standoffs 52 are positioned to that they will engage the end face 46 on either side of optical fiber ends or other optical surfaces. exposed through end face 46, thereby preventing plug 10 contact with the optical fibers (not shown).

The plugging portion 12 is preferably configured with the side edges 24 formed in an arcuate shape, but may be any shape desired to engage the side walls 68 of channel 60. This arcuate shape permits the plugging member 10 to conform to the curved side walls 68 of channel 60. This arcuate edge shape is advantageous in that the deflection of the side edges 24 of plug 10 will be generally uniform and consistent about the periphery of plugging portion 12, thereby creating a substantially uniform sealing engagement between plug 10 and the channel walls 68.

At this point, refer to FIG. 3. An optical subassembly 56 is illustrated in section view with the plug 10 inserted into channel 60 and fully seated against end face 46.

The edges 26 and 28 of plugging portion 12 of plug 10 are shown engaged with the walls 68 of channel 60. The standoffs 52 of plugging portion 12 are engaged with end face 46 of channel 60.

When plug 10 is pulled by grasping grip 20 and displacing grip 20 leftward in FIG. 3, the plugging portion 12 will deform in the region of the margins 40 shown in FIG. 2 and wipe the interior surfaces of the walls 68 of channel 60 as the plug 10 is removed, thereby removing any residual water or any dust or other particulate contaminants.

Plug 10 may be left in position after the assembly of the optical subassembly connector and its installation into a host computer, server or other electronic device (not shown) to protect the optical elements until an optical fiber cable is connected to the host device at the connector 56, thereby preventing possible contamination during shipping, handling or installation.

The elastomeric nature of the material from which the plug 10 is fabricated is very advantageous in a further aspect. The fluoro-elastomer material, while heat sensitive, will soften somewhat during the soldering reflow operations, but will continuing to maintain a seal with the walls of the connector portion 58 of the optical subassembly 56, the material will not exert such a force on the walls 68 of the channel 60 that any significant deformation of the connector will occur during the time of or a result of the heating of the optical subassembly connector during solder reflow. The structure of the optical subassembly 56 is typically molded from a plastic. The plastic is selected to withstand limited exposure to the solder reflow temperatures but may soften to some slight extent, among other attributes. It is therefore important that the sealing forces of the plug not cause undesirable deformation of the optical subassembly 56 under these conditions.

Other variations, changes or modifications to the invention may become apparent to one of skill in the art, but those minor variations, changes or modifications are within the scope of the invention disclosed herein and will not cause the removal of the resulting device from the scope of the attached claims.

While this invention is disclosed as a solution to the problem of preventing damage to or contamination of the optical elements and surfaces of an optical subassembly in an electro-optic communications system, it should be understood that this type plug may be used in any instance in which a channel should be plugged against the intrusion of contaminants such as water or dust, during processes included in the manufacturing of an item, or during assembly of the item into a larger assembly or during shipping and handling.

This Detailed Description of the Invention is provided so that one of skill in the art will be enabled to practice the invention but the Detailed Description of the Invention is not intended to nor should it be used in any manner to limit the scope of the invention. The scope of the invention is intended to be determined solely by the appended claims.

We claim:

1. A sealing plug for insertion into a receiving cavity comprising:
   a substantially planar sealing member of a size exceeding a cross-sectional size of said receiving cavity, said sealing member conforming to a cross-section of said receiving cavity;
   a stem extending substantially normal to one surface of said sealing member;
   a manually engageable portion on a distal end of said stem to allow said stem to be grasped and for pulling said stem and said sealing member;
   said sealing plug being deformable to create a wiping seal upon insertion into a mating receiving cavity and a wiping contact with said cavity whenever said plug is removed from said cavity,
   thereby reliably sealing said cavity and removing contamination from said cavity during removal of said plug from said cavity.

2. The sealing plug of claim 1 wherein said stem joins said sealing member in a zone substantially larger than an area of a cross-section of said stem and smaller than said one surface of said sealing member.

3. The sealing plug of claim 2 wherein said manually engageable portion comprises surface irregularities for enhancing manual engagement therewith.

4. The sealing plug of claim 2 wherein said stem further comprises an extending key portion disposed substantially parallel with said stem and extending to and joining a portion of said sealing member, whereby said key portion supports a portion of said sealing member and provides stability to said portion.

5. The sealing plug of claim 2 wherein said stem further comprises a progressively enlarging cross-section as a distance from said sealing member toward said distal end of said stem decreases.

6. The sealing plug of claim 2 wherein said stem further comprises a plurality of receiving cavities of elongated configuration disposed in opposing sides of said stem, said cavities extending such that the elongation thereof is disposed substantially parallel to an axis of said stem, whereby said cavities may accept elongated members within said receiving cavities.

7. The sealing plug of claim 2 wherein said sealing member comprises at least one pair of opposing edges, said at least one pair of edges outlining non-linear edge shapes, each of said one pair of non-linear edge shaped opposing edges forming intersections with a second pair of opposing edges at a distance between said intersections for each of said non-linear shaped edges with a common one of said second pair of edges at a spacing greater than a distance separating two adjacent corners of a cross-section of said cavity to be sealed.

8. The sealing plug of claim 2 wherein said sealing member comprises at least a standoff member disposed on and projecting from an exposed surface of said sealing member, said standoff member dimensioned and positioned relative to said exposed surface to be insertable into and abut an end surface of said receiving cavity.

9. A method of protecting optical surfaces of an optical components at least during assembly into an optical subassembly, comprising the steps of:

providing electronic components having at least two electrical solder contacts and qt least an optical component having at least one exposed optical surface thereon;

applying solder flux to at least one of said at least two solder contacts;

applying solder to at least one of said at least two solder contacts;

disposing said solder contacts juxtaposed with each other and in contact with said solder flux and/or said solder;

disposing said optical components in a desired spatial relation to said electronic components;

assembling said electronic components and said optical components into an optical subassembly by enclosing at least said exposed optical surface within a portion of a housing of said optical subassembly;

inserting a sealing plug into said housing, said sealing plug having a sealing portion, a standoff projection extending from one face of said sealing portion, a stem extending from a second face of said sealing portion, and a finger graspable portion on and displaced from said sealing portion of said stem, at least a portion of said sealing portion forming a margin region of highly deformable material sealingly engaged with said housing and said standoff portion of said sealing portion engaged with an end surface of said housing into which said sealing portion is inserted and said standoff engaged and, thereby preventing said sealing portion from contacting said optical surfaces;

reflowing said solder to establish electical connection between said juxtaposed solder contacts, and washing said subassembly to remove any solder flux, solder or other contaminants remaining after said solder reflow step, whereby residence of said plug within said housing during at least solder reflow and washing steps protect said optical surfaces.

10. The method of claim 9 wherein said inserting step further comprises the step of deforming said margins of said sealing portion, thereby creating a wiping engagement of said sealing portion with interior surfaces of said housing.

11. The method of claim 10 further comprising the step of wipingly cleaning said interior surface of said housing by removing said plug.

12. The method of claim 10 further comprising the step of assembling said sealed optical subassembly into a further device prior to the step of removing said plug.

13. The method of claim 12 further comprising an additional step of shipping said further device and said sealed optical subassembly prior to the step of removing said plug.

14. The method of claim 9 wherein said steps of applying solder flux and applying solder are combined in a step of applying a mixture of solder and solder flux.

15. A method of protecting optical surfaces of optical devices within an opto-electronic device during at least manufacturing operations, comprising the steps of:

providing electrical components to be included within said opto-electronic device;

applying solder flux and solder to solder contacts of at least some of said electrical components to be included within said opto-electronic device;

providing said optical devices;

providing a housing for said opto-electronic device;

sealing said housing where said optical surfaces would be exposed whenever installed within said housing;

disposing said optical devices and said electronic devices in desired positions relative to said housing;

heating and reflowing said solder to establish electrical connections between said electronic components;

washing said housing, said electronic components and said optical components, thereby removing residual solder flux, solder or other contaminants therefrom, whereby said optical surfaces are protected during at least said solder reflow and washing steps.

16. The method of claim 15, wherein said sealing remains in effect during subsequent handling, assembly into larger assemblies and shipping of said larger assemblies, whereby said protected status continues after said solder reflow and washing steps.

17. The method of claim 16 further comprising the step of wiping interior surfaces of said housing in contact with said plug whenever said plug is removed, thereby insuring that contaminants are removed from said housing during said plug removal.

18. A method of protecting optical surfaces of optical components of opto-electronic subassemblies during assembly, handling, installation into a host device and shipping of said host device, comprising the steps of:

sealing access to said optical surfaces, whenever said optical surfaces are disposed within a housing, with a plug comprising a sealing portion, a stem projecting from said sealing portion and a finger engageable portion on said stem;

applying solder flux and solder to selected electrical connection surfaces on electronic components to be incorporated into said opto-electronic subassembly;

assembling electronic and optical components within said housing with electrical connection surfaces disposed juxtaposted said selected electical connection surface and said solder flux and solder;

reflowing said solder to establish electrical connections;

washing said opto-electronic subassembly to remove residual solder flux, residual solder and any contaminants from said opto-electronic subassembly;

leaving said plug in sealing position within said housing during and subsequent to said reflowing said solder until the opto-electronic subassembly is optically connected to an optical signal carrying member.

19. The method of claim 18 comprising a further step of:

removing said plug and simultaneously deforming said sealing portion to create a wiping action relative to said housing, and wiping any contaminants within a path of said plug from said housing.

* * * * *